June 28, 1966 W. T. MERKER ETAL 3,257,686
LENS ALIGNING AND BLOCKING APPARATUS
Filed Feb. 25, 1963 4 Sheets-Sheet 4

INVENTORS
WILLIAM T. MERKER
NORMAN W. SHATZEL
BY
ATTORNEY

United States Patent Office 3,257,686
Patented June 28, 1966

3,257,686
LENS ALIGNING AND BLOCKING APPARATUS
William T. Merker, Orchard Park, and Norman W. Shatzel, Williamsville, N.Y., assignors to American Optical Company, Southbridge, Mass., a voluntary association of Massachusetts
Filed Feb. 25, 1963, Ser. No. 260,476
9 Claims. (Cl. 18—5)

This invention relates to apparatus for aligning and blocking lenses in preparation for subsequent manufacturing operations to be performed thereon. More particularly, the invention has reference to apparatus for aligning ophthalmic lens blanks having optically finished opposite side surfaces and for forming a block upon one of said side surfaces to be used in conjunction with apparatus for edge finishing said blanks to the shape and size required for proper fitting in ophthalmic mountings intended to receive the same.

In ophthalmic optics, finished prescriptive lenses have two different kinds of centers, geometric centers and optical centers. While these centers might coincide in position on the lenses, they are determined differently. The geometric center, often referred to as the mechanical center, is the mechanical midpoint of the finished lens shape and is the point about which a lens blank must be centered and revolved during edge finishing operations. The optical center is the point on a lens where the prism power is zero. It is physically located on the finished lens by a line through the centers of curvature of the front and back surfaces and its actual location is established by second side surfacing operations.

Following such second surfacing operation and in preparing a lens blank for cutting or edging to its final shape, a mechanical center which is to become the geometrical center of the finished lens must be located at the lens blanks and the blank must be so adapted to cutting or edging machinery as to revolve about said mechanical center.

Heretofore, the procedure in preparing a lens blank for cutting and edging involved various tedious, time consuming and generally complex operations requiring that the lens blank be aligned relative to a chart or the like, machine or hand marked to locate a mechanical center thereon for cutting or edging, thereafter the lens was realigned with reference to said marking in a jig or fixture for proper orientation and centering in cutting or edging apparatus.

In addition to being tedious and time consuming, conventional aligning and realigning operations following second side surfacing are a constant annoyance and source of error requiring special attention and skills to perform.

An object of the present invention is to minimize the number of operations required to prepare an optically finished lens blank for edging and to render the procedure simple and straight forward to perform. Thus, the requirement for special skills is reduced or eliminated. The present invention constitutes an improvement over prior practices by providing for both the aligning and blocking of lens blanks in a single operation. A block is formed in predetermined aligned relation on each lens blank to provide means for automatically properly aligning the blank in a holder on apparatus used in edge finishing operations.

Another object of this invention is to provide improved lens aligning and blocking apparatus for molding blocks directly and securely upon lens blanks in accurate predetermined alignment thereon, the block being molded largely or entirely of a material having a low-melting point such that it may readily be melted for removal and reuse after completion of manufacturing operations on the lens.

To attain the aforesaid objects and others which may appear from the follownig detailed description, in accordance with the principles of the present invention, we provide lens aligning and blocking apparatus having a pair of transparent target members each provided with lens aligning indicia. The target members are supported in superimposed adjacent relation with each other. One of the members, being stationary, is provided with lens supporting pins upon which a lens blank to be aligned and blocked is positioned. Light is projected through the target members and lens blank onto a translucent screen upon which is formed a composite shadow image of the indicia on the target members together with a similar image of characteristic portions of the lens blank such as, for example, the outline of a bifocal segment therein or axis lines, dots or other reference markings previously provided on the lens blank.

The indicia on the stationary target member is centered on an established reference axis in the apparatus.. They are used, when viewed on the screen, to measure amounts of lateral adjustment of the lens blank relative to the established reference axis. Alignment of the lens blank relative to the reference axis is accomplished by slidably adjusting the blank laterally on its supporting pins. The other target member is provided with indicia for asissting in locating reference markings and/or a segment portion of the lens blank relative to indicia on the stationary target member during alignment. This target member is adjustable in a plane parallel to the plane of the stationary target member for such purpose.

With a specific point on the lens blank aligned relative to the established axis in the apparatus as view in the screen, means are provided to swing an open-ended, block-forming mold against the lens blank. The mold clamps the lens blank in place against the supporting pins. Indexing means are provided to locate the block forming mold centrally upon the established axis relative to which the lens blank has been aligned. A dispenser of molten block forming material is then moved into position over the block forming mold to dispense a predetermined amount of block forming material thereinto. Upon cooling, a block is formed upon the lens blank which may conveniently be used in adapting the lens blank to cutting or edging machinery subsequently used to contour the lens blank to its final shape.

In an embodiment of the invention, the indicia on the stationary target member includes a group of horizontally disposed parallel lines preferably having one millimeter spacings therebetween with the centermost line of the group intersecting the established reference axis of the aligning and blocking apparatus. Along the centermost line are one millimeter graduations, one intersecting the reference axis, and others extending to each side thereof. Thus, in aligning a lens blank, its optical center or segment portion may be moved up or down or to one side or the other of the reference axis by known one millimeter increments in accordance with a desired or prescribed decentration of said optical center or segment portion relative to a mechanical center to be located on the blank for edging. In blocking the lens blank, the blocking mold is automatically centered upon the reference axis of the apparatus thereby establishing said mechanical center at the center of the block which is molded thereon.

In edge finishing operations, a profile cam or pattern is used to impart the final shape to the lens and the 180° meridian of the lens blank to be edged is required to be positioned in radial alignment with a corresponding 180° meridian of the pattern. In this way, edge portions of the lens blank will be profiled to the contour shape of corresponding edge portions of the pattern as referenced from the 180° meridian of the pattern which is commonly referred to as the cutting line.

In providing for such radial alignment of lens blanks together with establishment of their respective mechanical centers by blocking, the block forming molds of the present invention are so constructed and arranged as to provide respective blocks formed therein with a relatively long and narrow tang portion having its long dimension disposed parallel to the 180° meridian of the lens blank upon which the block is formed. In use, the tang portion of a block is keyed into a mating adaptor or chuck on edge finishing apparatus. Such action automatically radially aligns the 180° meridian of the lens blank carrying such block with the corresponding meridian of a pattern on the apparatus and, at the same time, locates the established mechanical center of the blank in coaxial relation with the corresponding center of the pattern.

The present invention will be more fully understood by reference to the following detailed description which is accompanied by drawings in which.

In the drawings, there is illustrated in FIGS. 1–7 an embodiment of the invention which comprises lens aligning and blocking apparatus 20 for aligning lenses and molding blocks in predetermined alignment thereon which are to be subsequently used in adapting said lenses to apparatus for performing edge finishing operations thereon.

Figure 9:
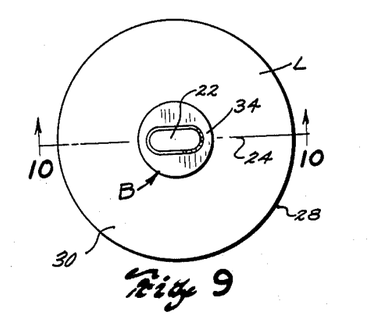
FIG. 9 is a plan view of a lens blank having a block formed thereon by the use of this embodiment.
Figure 10:
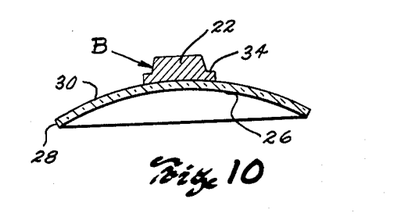
FIG. 10 is a cross-sectional view taken on line 10—10 of FIG. 9.

Lens blank L is illustrated in FIGS. 9 and 10 as having block B molded thereon, said block being provided with a relatively long and narrow tang portion 22 in parallel alignment with an established major meridian 24 of lens blank L. Thus, the lens blank may be supported in an edge finishing machine in a predetermined orientation during operations to be subsequently performed in said machine. As illustrated, lens blank L is round and includes a concave surface 26, an edge 28 to be subsequently cut or ground to a finished lens shape and convex surface 30 upon which block B is secured. It should be understood however, that the lens aligning and blocking apparatus 20 provided by this invention is adapted to align and block a lens blank of any other type whether the shape is round or otherwise.

Figure 11:
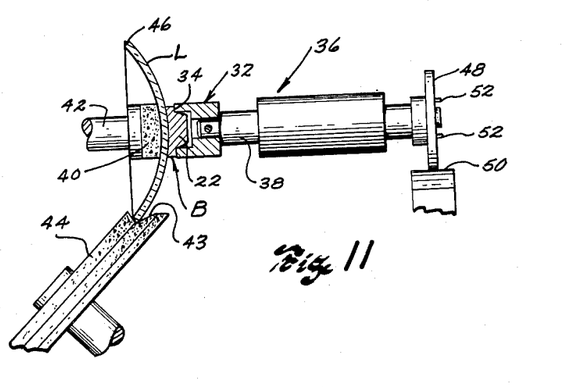
FIG. 11 is a partial diagrammatic view illustrating the use of the lens block in performing a finishing operation on the lens blank.

Tang portion 22 is adapted to be received in an adaptor or chuck 32 on machinery for performing edge finishing operations on lens blank L as shown in FIG. 11. Shoulder 34 is provided on block B to assure proper axial spacing and squareness of block B in chuck 32. Shoulder 34 engages the face of chuck 32 to thereby align the axis of block B with the axis of chuck 32. Tang portion 22 assures proper radial alignment of block 8 in chuck 32.

The structural characteristics of block B shown in the drawings have been selected for purposes of illustration only and it should be understood that the apparatus of the invention can be designed to provide a lens blank with a wide variety of lens block configurations.

The blocked lens blank L can be supported in a variety of lens cutting or edging machines such as, for example, a lens edging machine 36 of the type diagrammatically illustrated in FIG. 11 which might be used in laboratories for finishing lens blanks to their proper shape and size for fitting in opthalmic mountings. In lens edging machine 36, block B is received within chuck 32 on spindle 38 and is held therein by clamping pad 40 on spindle 42 which rotates in unison with spindle 38. Edge 28 of lens blank L is engaged in groove 43 of rotating beveled grinding wheel 44 and spindles 38 and 42 are simultaneously rotated for progressively advancing all portions of edge 28 of lens blank L into abrading relation with wheel 44 to provide blank L with a beveled edge 46. Blocked lens blank L is adapted to move toward and away from wheel 44 for determining the final lens shape in response to movement imparted ot spindle 38 and 42 by profile cam or pattern 48. Pattern 48 is mounted on spindle 38 in fixed radial alignment thereon and engages a stop or contact shoe 50 when lens blank L approaches its finished size. As it is conventional, pattern 48 is provided with the contour shape desired to be provided on lens blank L and is keyed to spindle 38 with pins 52 or the like so as to have its 180° meridian parallel to the long dimension of tang portion 22 of block B. Thus, after edge grinding, the shape of lens blank L will correspond to that of pattern 48 as referenced from the established 180° meridian of pattern 48. The level of shoe 50 relative to the effective abrading area of wheel 44 will determine the finished size of lens blank L.

It can be seen that a block molded upon a lens blank must be formed of a material sufficiently strong to withstand stresses on the block during edge cutting or abrading operations and must not be significantly weakened by heat generated during edging. The block forming material must have a low melting point for permitting both convenient molding of the block on the lens blank and removal of the block after completion of edging. The block must be accurately formed to assure proper centering thereof in a machine chuck such as illustrated in FIG. 11, and must be accurately aligned relative to a predetermined center and major meridian of the lens blank. The blocking material may consist of a metallic alloy or plastic material adapted to provide the above characteristics. For example, a desirable block forming material would be one of the low melting point alloys known as "Cerro-low" or "Cerro-bend" manufactured by Cerro de Pasco Company, which liquify at temperatures between 117° and 156° Fahrenheit and which have a very low coefficient of thermal expansion.

Figures 2, 3:
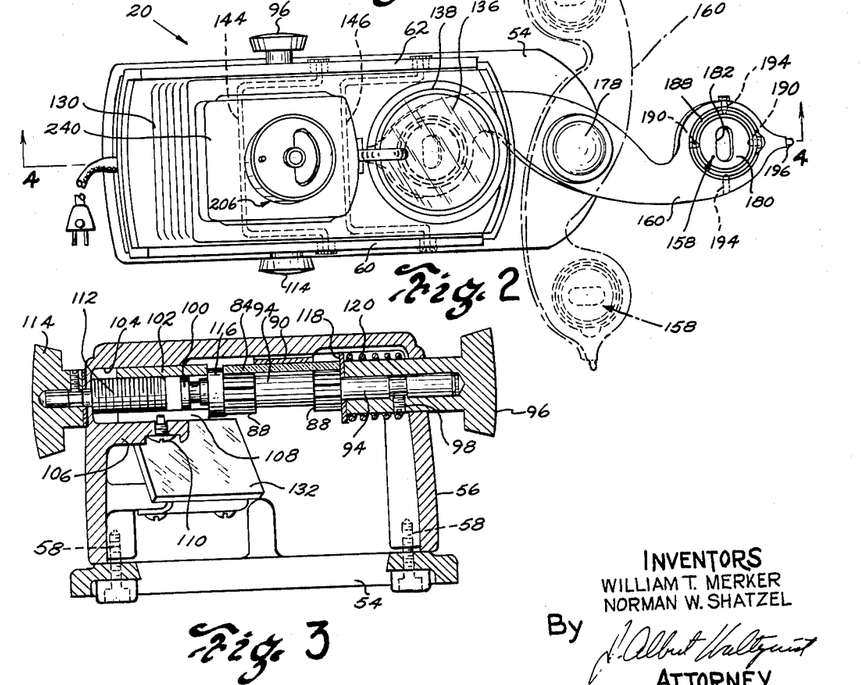
FIG. 3 is an enlarged cross-sectional view taken on line 3—3 of FIG. 1.

Now with reference to the structure used to locate and form block B, apparatus 20 comprises base plate 54 upon which housing 56 having a hollow interior is mounted and held in position by anchoring screws 58 (see FIG. 3). Housing 56 which, together with base plate 54, forms the main supporting structure of apparatus 20 is provided with side arm portions 60 and 62 which extend upwardly adjacent its rearward end and thence forwardly in overhanging relation with the main body portion thereof.

Figures 4, 8:
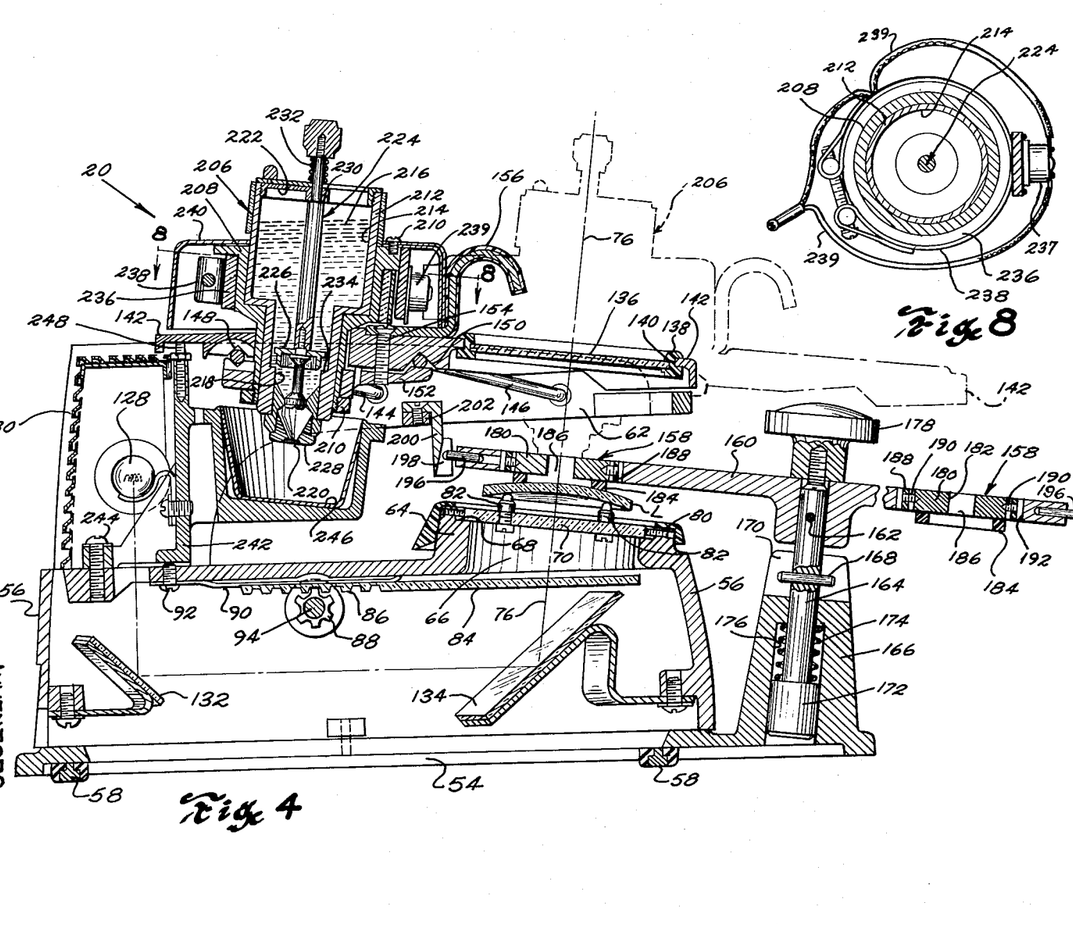
FIG. 4 is an enlarged cross-sectional view taken on line 4—4 of FIG. 2.
FIG. 8 is a cross-sectional view taken on line 8—8 of FIG. 4.
Figures 5, 6, 7:
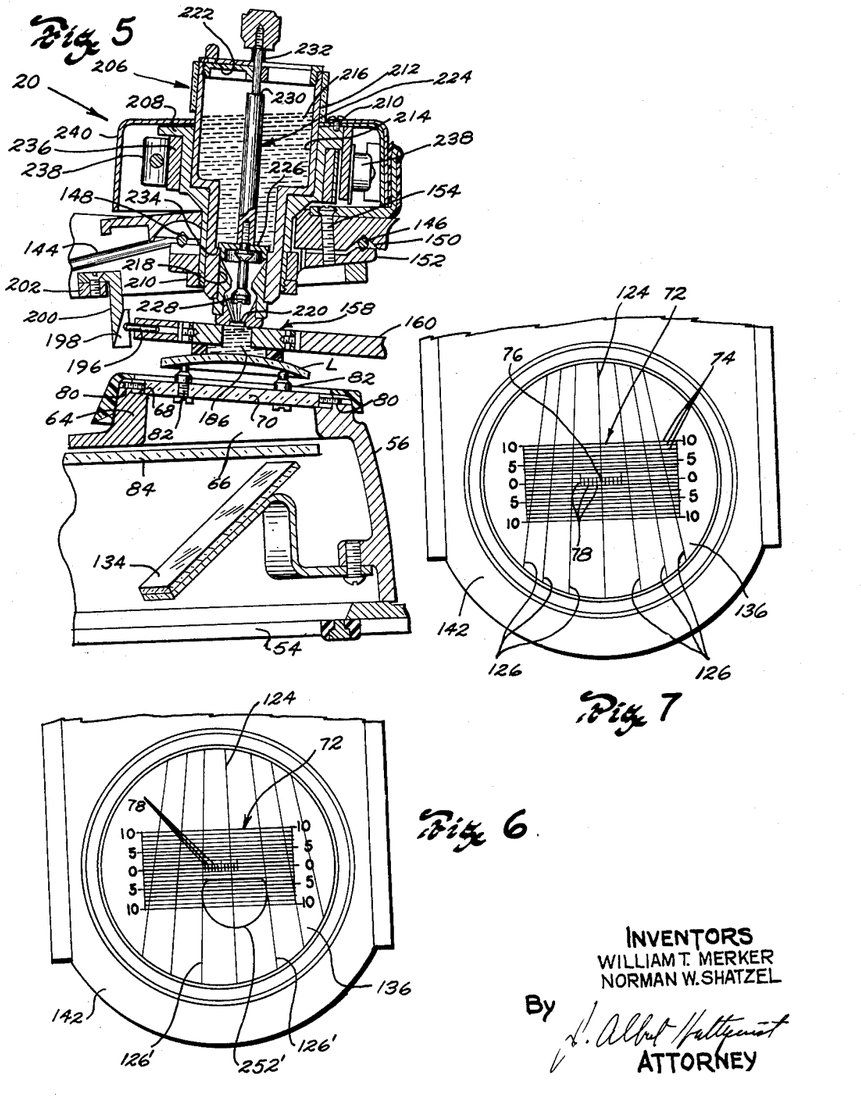
FIG. 5 is a fragmentary cross-sectional view similar to FIG. 4 illustrating a portion of the apparatus in a differently adjusted position of use.
FIGS. 6 and 7 are fragmentary plan views of a lens aligning section of the apparatus.

On the top of housing 56 adjacent its forward end, a raised section 64 is formed, circular in shape and provided with circular aperture 66 (see FIG. 4) which opens into housing 56. The portion of section 64 surrounding aperture 66 is shouldered at 68 to receive transparent target member 70 which seats against shoulder 68. Target member 70 is formed of glass or a clear rigid plastic material and is provided with etched, printed or otherwise applied lens blank aligning indicia 72 such as illustrated in FIGS. 6 and 7. Indicia 72 as viewed from the front of apparatus 20, embody a plurality of horizontally disposed parallel lines or graduations 74 (FIG. 7) each spaced a measured distance, preferably one millimeter apart. The centermost of said lines is marked with a zero at each end and appropriate calibrations are applied to each end of more remote lines. The zero line is positioned to intersect an established axis 76 extending through aperture 66 (see FIG. 4). Along the centermost or zero line are graduations 78 spaced one millimeter apart with the centermost graduation 78 intersecting axis 76 on zero line 74. Target member 70 is centered relative to axis 76 on shoulder 68 and thereafter held stationary by holding screws 80. Lens supporting pins 82 are provided on target member 70 upon which a lens blank L to be aligned and blocked is positioned as will be described in detail hereinafter.

Internally of housing 56 and disposed beneath target member 70 is a second transparent target member 84 formed of glass or a transparent rigid plastic material. On the portion of target member 84 which is disposed beneath target member 70, lens aligning indicia is provided either by etching, printing or otherwise forming lines thereon. These indicia, as shown in FIGS. 6 and 7, are in the form of a center line 124 disposed perpendicular to lines 74 of target 72 and a series of oblique lines 126 equally spaced at opposite sides of line 124. Corresponding lines 126 at opposite sides of line 124 are forwardly divergent and each form respective legs of a V. As it will become apparent hereinafter, these lines are used to assist in locating the segment portion of a multifocal lens blank relative to axis 76 during operation of apparatus 20.

Adjacent its rearward end, the under side of target member 84 is provided with gear teeth in the form of a rack portion 86 which is supported upon drive pinions 88 (see FIGS. 3 and 4) for adjusting target member 84 forward and back relative to stationary target members 70 in housing 56. Target member 84 is resiliently held in position against pinions 88 by leaf spring 90 having one end 92 thereof connected to housing 56 as illustrated in FIG. 4.

As it can best be seen in FIG. 3, pinions 88 are carried by drive shaft 94 which is supported by operating knob 96 journalled in the side wall of housing 56. Shaft 94 is fixed to knob 96 by set screw 98 so that rotation of knob 96 in one direction will cause rotation of pinions 88 and movement of target member 84 rearwardly in housing 56 while rotation of knob 96 in the opposite direction will cause movement of target member 84 forwardly in housing 56. The end of shaft 94 opposite to knob 96 is journalled for rotation at 100 in one end of bushing 102. Bushing 102 is fitted for sliding axial movement in a bore 104 provided in enlargement 106 of housing 56. Bushing 102 which is keyed against rotational movement in bore 104 by slot 108 and screw 110 is internally threaded throughout the major portion of its length. Lead screw 112 is entered into bushing 102 for effecting sliding adjustment of bushing 102 in bore 104. Lead screw 112 is journalled for rotation in the adjacent side wall of housing 56 and provided with operating knob 114 for effecting rotation thereof.

Operating knob 114 is used to produce sidewise adjustment of target member 84 relative to target member 70 and to accomplish this, target member 84 is held between collar members 116 and 118 provided on shaft 94 adjacent respective pinions 88. Knob 96 is axially slidable in housing 56 and the entire assembly of knob 96, shaft 94, pinions 88 and target member 84 is biased by spring 120 against bushing 102. Thus, rotation of knob 114 in one direction causing threading of lead screw 112 within bushing 102 will move bushing 102 toward the opposite side of housing 56 thereby forcing the assembly carrying target member 84 to follow. Rotation of knob 114 in the opposite direction will retract bushing 102 and, at the same time, spring 120, under compression, will cause the entire assembly which carries target 84 to move accordingly.

From the foregoing, it can be seen that movement of target member 84 forward and back in housing 56 is effected by operation of knob 96 while movement of target member 84 sidewise in housing 56 is effected by operation of knob 114.

In order to illuminate target members 84 and 70 and a lens blank L placed upon supporting pins 82, lamp 128 is provided within louvered enclosure 130 at the rear of housing 56 between side portions 60 and 62 thereof. Lamp 128 is so positioned in enclosure 130 as to emit light downwardly into housing 56 upon mirror 132 which then directs said light forwardly to a second mirror 134. Mirror 134 is so arranged as to then direct the light upwardly along axis 76 through target members 84 and 70 and lens blank L. By projecting light from lamp 128 along an extended path as just described prior to its reaching target members 84 and 70, a relatively sharp shadow image of indicia on target members 84 and 70 will be produced upon translucent viewing screen 136 when said screen is positioned as shown in FIG. 4 to receive light projected along axis 76.

Viewing screen 136 is formed of ground glass or a similarly characterized rigid plastic material and is supported in ring-like retainer 138 fitted in a suitable opening 140 provided in the forward end portion of plate-like carrier member 142. Carrier member 142 is mounted between the forwardly extending sections of side portions 60 and 62 of housing 56 upon parallel pivot arms 144 and 146 (see FIGS. 2 and 4) each having their respective opposite ends journalled in side portions 60 and 62. Arms 144 and 146 are generally U-shaped as best illustrated in FIG. 2 and the centermost portions thereof are seated in V-shaped bearing sockets 148 and 150 provided on the under side of carrier member 142 (see FIG. 4). A retaining plate 152 held by screws 154 extending through carrier member 142 is provided to retain arms 144 and 146 respectively in sockets 148 and 150 while permitting relative rotational movement of arms 144 and 146 in said sockets.

It can be seen that arms 144 and 146 provide a parallel linkage permitting carrier member 142 to be selectively swung from a first position such as shown by full line drawing in FIG. 4 to a second position such as is illustrated by dot-dash outline in FIG. 4. Handle or finger hook 156 is provided for manually effecting such adjustment of carrier member 142.

With carrier member 142 in the above-mentioned first position as illustrated in FIG. 4, viewing screen 136 is automatically centered on axis 76 so as to receive a composite shadow image of the indicia on target members 84 and 70 together with a shadow image of axis markings, dots or an outline of a segment portion of lens blank L placed upon pins 82. In this way, and as it will be described in greater detail hereinafter, a point of reference on lens blank L can be positioned in desired aligned relation with axis 76 as referenced from the image of indicia 72 seen on screen 136. That is, axis 76 passes through the zero line of indicia 72 and the center line of graduations 78 so that, by effecting sidewise movement of lens blanks L on pins 82, a specific point of reference on the lens blank or a segment portion thereof can be accurately adjusted above or below to the right or left of axis 76 by measured amounts as determined by indicia 72, the image of which is viewed on screen 136.

In accordance with a particular feature of this invention, a block is formed upon a lens blank once the lens blank is aligned in the apparatus 20 as described above. To accomplish this end, block forming molds 158 carried by a rotatable supporting arm 160 are arranged to be selectively swung into alignment with axis 76 and seated upon a lens blank which is rested upon pins 82.

Figure 1:
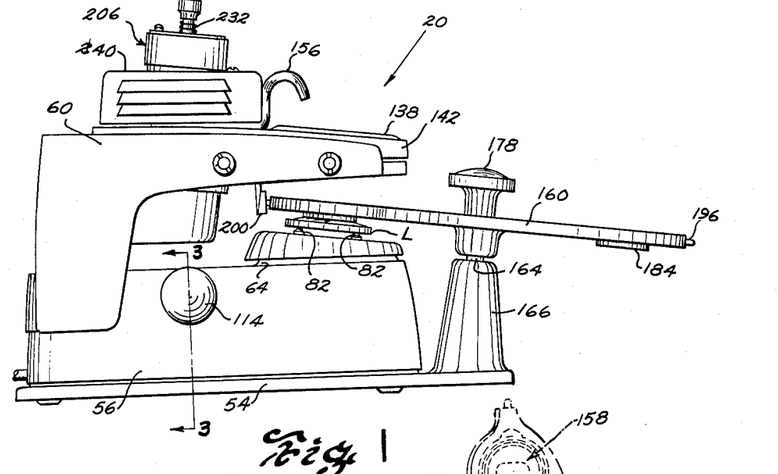
FIG. 1 is a side elevational view of an embodiment of this invention and FIG. 2 is a plan view of said embodiment.

Turning now to a detailed consideration of the block forming apparatus it can best be seen in FIGS. 1, 2 and 4 that supporting arm 160 is pinned at 162 to supporting shaft 164 which is journalled for rotation in an upstanding enlargement 166 of base plate 54. Shaft 164 is provided with indexing pin 168 extending transversely therethrough which fits relatively loosely in bifurcation 170 provided in the upper end of enlargement 166 of base plate 54. It will become more apparent as this description progresses, that pin 168 functions only to roughly or approximately align a block forming mold 158 with axis 76 by fitting into bifurcation 170 when arm 160 is directed over lens blank L. Means to be described shortly is provided for achieving accurate alignment of block forming molds 158 relative to axis 76.

Shaft 164 is further provided with an enlarged terminal end portion 172 and is spring loaded downwardly by compression spring 174 confined between end portion 172 of shaft 164 and the upper end of bore 176 in which portion 172 is fitted for sliding and rotational movement. Handle 178 is provided on the upper end of shaft 164 to provide convenient means for lifting supporting arm 160 and shaft 164 to disengage pin 168 from bifurcation 170 thereby to permit rotation of arm 160 and placement of a selected block forming mold over lens blank L or to selectively swing arm 160 to the position shown by dot-dash outline in FIG. 2.

In the embodiment illustrated, block forming molds 158 each comprise a disc-shaped main body portion 180 having aperture 182 centrally disposed therein. Aperture 182 is shaped to the configuration of tang portion 22 of block B shown in FIGS. 9 and 10 and functions to form this part of block B. Cemented or otherwise attached to the underside of body portion 180 is a slightly resilient ring 184 preferably formed of a semi-hard rubber or similarly characterized synthetic material which will not appreciably distort under force exerted by spring 174 and will not scratch or otherwise damage the surface of a lens blank against which it is positioned. Ring 184 forms the lower or shouldered portion 34 of block B and together with aperture 182 forms the mold cavity 186 in which block B is molded directly upon lens blank L.

Block forming molds 158 are, as shown in FIG. 2, gimble mounted adjacent respective opposite ends of arm 160 by the provision of rings 188 to which they are pivotally mounted with diametrically opposed pivot pins 190. Rings 188 are, in turn, positioned in loose fitting apertures 192 in arm 160 and pivotally mounted to arm 160 by diametrically opposed pivot pins 194. Pivot pins 194 are positioned in line with the long dimension of aperture 182 in respective block forming molds 158 and are so located in arm 160 as to align the long dimension of aperture 182 parallel to lines 74 on target member 70 when a respective block forming mold is properly indexed to a position thereover. Block forming molds 158 are located on arm 160 at such radial distances from the axis of shaft 164 as to become centered upon axis 76 of apparatus 20 when positioned as shown in FIG. 4.

Protruding from opposite ends of arm 160 are locating pins 196 which are adapted to fit closely in an indexing slot 198 of a locating bracket 200 shown in FIG. 4; one side of slot 198 is cut away by the cross-section in FIG. 4 for purposes of illustrating the position by one of pins 196.

Bracket 200 is supported by a cross member 202 extending between side portions 60 and 62 of the main supporting structure and depends therefrom for engagement by pins 196.

In placing a block forming mold 158 in accurately centered relation with axis 76 and in seated relation on a lens blank L, arm 160 is rotated until indexing pin 168 drops into bifurcation 170. At this time arm 160 will lower and, upon doing so, locating pin 196 is caused to fit into slot 198 and accurately position its respective adjacent block forming mold 158 in centered relation with axis 76. Shaft 164, being spring loaded as described above, causes ring 184 to seat firmly against lens blank L to clamp lens blank L fixedly against pins 82 and simultaneously form a fluid tight seal around the base of mold cavity 186. The gimble mounting of block forming molds 158 assures perfect seating thereof upon a lens blank at all times regardless of the surface curvature of the lens blank.

In order to fill a block forming mold 158, so positioned upon a lens blank L with block forming material, this embodiment of the invention features a novel dispenser 206 supported on carrier 142 for movement into position over block forming mold 158 in the manner best illustrated in FIG. 5 by full line drawing and in FIG. 4 by dot-dash outline.

Dispenser 206 extends through the rearward portion of carrier 142 and is removably supported in holder 208 which is shouldered against carrier 142. Retaining nut 210 is threaded upon the depending end of holder 208 to secure the same in place upon carrier 142.

Dispenser 206 comprises a main body part 212 having an enlarged upper reservoir section 214 for receiving and supporting a supply of fluid block forming material 216. Depending from reservoir section 214 is a reduced section of dispenser 206 leading to a measuring section 218 which receives block forming material by gravity flow from reservoir section 214 and is of such controlled size as to contain only a sufficient amount of block forming material to fill the cavity 186 of one block forming mold without overflow. Beneath measuring section 218 is a dispensing nozzle 220 through which block forming material 216 is ejected into block forming molds 158.

Body part 212 of dispenser 206 is provided with top plate 222 secured thereto. Plate 222 supports plunger 224 which extends substantially coaxially into body part 212 and carries a pair of valve members 226 and 228 adjacent its depending end. Plunger 242 is shouldered at 230 and, by the provision of spring 232, it is normally held upwardly with its shoulder 230 against top plate 222. In this position (see FIG. 4), valve 228 forms a closure between measuring section 218 and nozzle 220 while at the same time, valve 226 is in such position as to allow a flow of block forming material from reservoir section 214 into measuring section 218. In depressing plunger 224 to the position as shown in FIG. 5, valve 226 first closes communication between reservoir section 214 and measuring section 218 and thereafter valve 228 is opened. Thus only the amount of block forming material contained in measuring section 218 is dispensed through nozzle 220.

It will be noted that valve 226 is cup-shaped and directed downwardly so as to support an air pocket internally thereof. In this manner of construction, air pressure in the pocket of valve 226 is caused to build up by pressure of the blocking medium against the air pocket during movement of valve 226 from its upper position shown in FIG. 4 to its lower closed position against shoulder 234 shown in FIG. 5. In so doing, block forming material in measuring section 218 is forced into and through nozzle 228 under slight pressure when valve 228 opens. Thus, possible stoppage of the block forming material caused by the effects of surface tension or other effects is avoided.

As pointed out hereinabove, a preferrred block forming material would be one of the well-known and commercially available low melting point alloys which liquify at temperatures between 117° and 156° Fahrenheit. In order to maintain the material in a liquid condition in dispenser 206, a thermostatically controlled electrical heating ring 236 is clamped about holder 208 whereby block forming material 216 is heated by conduction through holder 208 and body part 212 of dispenser 206. Heating ring 236 may be of any conventional design such as that illustrated in FIGS. 4 and 8 and which is electrically connected in series with a conventional thermostat 237 by electrical leads 239 for controlled operation thereof to maintain said block forming material at a substantially uniform temperature and readily flowable at all times while in dispenser 206.

Heating ring 236 is held in position by ring clamp 238 as shown in FIG. 8 and a protective cover member 240 attached to holder 208 by screws 210 is provided to protect the operator from accidental contact therewith.

On housing 56 there is provided an upstanding bracket 242 (FIG. 4) fastened thereto by screws 244. Bracket 242 supports a drip pan 246 disposed beneath nozzle 220 of dispenser 206 to collect drippings of block forming material which might result from accidental depression of plunger 224 when carrier 142 is in the above described first position illustrated in FIG. 4.

Adjustable stop screw 248 is provided on the uppermost end of bracket 242 to locate carrier 142 in the first position shown by full line drawing in FIG. 4 wherein viewing screen 136 is disposed in substantially coaxial alignment with axis 76. With carrier 142 in its second position as illustrated by dot-dash outline in FIG. 4 and by full drawing in FIG. 5, nozzle 220 of dispenser 206 is automatically located centrally upon a particular block forming mold 158. At this time, plunger 224 is depressed to fill cavity 186 in mold 158 to form a block B on lens blank L as will be set forth in detail in a description of the operation of apparatus 20 which follows:

As is well known in the art of ophthalmic optics the segment portion of a finished multifocal lens must be decentered or inset relative to the optical or sighting center of the distance portion of the lens so as to compensate for the difference between the patient's far and near interpupillary distances. Common practice in decentering bifocal segments is to inset the segment center by one half the difference between the far and near interpupillary distances. Also, it is common practice to locate the bifocal segment a prescribed distance below the optical or sighting center of the distance portion of the lens blank so as to place the segment where it can be fully used by the patient when lowering the eyes in the normal manner for reading through the segment.

In cutting and/or edging bifocal lens blanks to their finished shape, the amount of inset and vertical positioning of their segment positions, as prescribed by the optometrist, and the shape and size to which the lens blank is to be edged must be considered in locating a mechanical center upon the blank about which it is to be revolved for edging; the mechanical center being the geometrical center of the finished lens.

Figure 12:
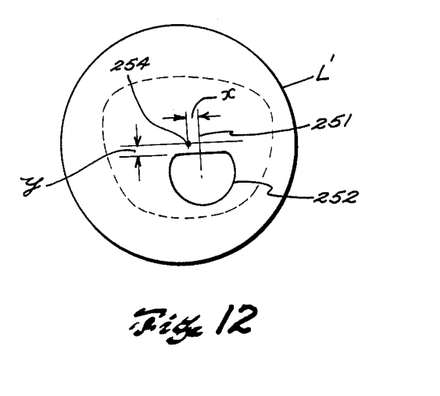
FIG. 12 is a plan view of a lens blank which is used in conjunction with FIG. 6 to illustrate the principles of operation of the apparatus.

In order to illustrate the operation of apparatus 20 of the invention, bifocal lens blank L' is shown in FIG. 12 which is to be edged to the shape shown by dotted line 250 having its geometrical center offset from the vertical center line 251 of segment 232 a distance X and also located a distance Y above segment 212.

Considering the distances X and Y to each be 3 millimeters as determined from the prescription for lens blank L' prepared by the optometrist, lens blank L' would be aligned and blocked on apparatus 20 as follows:

Arm 160 which carries block forming molds 158 is swung to the position shown by dot-dash outline in FIG. 2 and carrier 142 is placed in its first position with viewing screen 136 disposed over target member 70 as shown by full line drawing in FIGS. 1, 2 and 4. At this time, with lamp 128 operating, a composite shadow image of indicia on target members 70 and 84 is seen on screen 136. Knowing that segment 252 is required to be decentered the distance X of 3 millimeters to the right as shown in FIG. 12, knob 114 is operated to move target member 84 to the right an amount such as to locate the image of its center line 124 on the third graduation to the right of the centermost one of graduations 78 as shown in FIG. 6.

Lens blank L' is then placed on supporting pins 82 in the manner illustrated by lens blank L in FIGS. 1 and 4 whereupon a shadow image 252' of the outline of segment 252 will become readily visible on viewing screen 136 as illustrated in FIG. 6. Lens blank L' is next adjusted laterally on pins 82 until the image 252' of its segment 252 is seen, as illustrated in FIG. 6, to be centered between a corresponding pair 126' of target lines 126 and its upper edge is located three lines below the zero line of indicia 72. Movement of target member 84 forward and back by operation of knob 94 assists in centering the image 252' of segment 252 accurately between lines 126'. The upper edge of segment 252 is oriented to a position parallel to lines 74 of indicia 72 also as shown in FIG. 6. Lens blank L' is then ready for blocking since axis 76 of apparatus 20 now passes through lens blank L' at the location of the predetermined mechanical center 254 (see FIG. 12) which will, after edging, become the geometrical center of the finished lens. Also, with the upper edge of segment 252 being parallel to lines 74, the 180° meridian of lens blank L' is established for blocking.

Lens blank L' is held with the fingers of one hand in the above described aligned position on pins 82 and, by operation of handle 178 with the other hand, arm 160 is indexed to place a block forming mold 158 upon lens blank L' in the manner previously described with relation to lens blank L and illustrated in FIG. 4. This clamps lens blank L' against pins 82. Carrier 142 is then shifted to its above described second or forward position as in FIG. 5 to place nozzle 220 of dispenser 206 over block forming mold 158. Plunger 224 is depressed and a measured quantity of block forming material is deposited in mold cavity 186.

After allowing a short period of time (a few seconds) for the block forming material to solidify in position against lens blank L', arm 160 is lifted and swung back to the position illustrated by dot-dash outline in FIG. 2, carrying lens blank L' along with it. A second lens aligning operation is carried out while the block forming material continues to cool in mold 158. The block forming mold at the opposite end of arm 160 is used for the second lens blocking operation and previously blocked lens blank L' is grasped with the fingers and removed from arm 160 together with the fully hardened and attached block formed thereon.

It should be understood that the amount of decentration required of a bifocal segment portion to the right or left and/or below a mechanical center on a multifocal lens blank is determined from the prescriptive requirements of the particular lens to be aligned and blocked and although only one illustration has been given, all of the requirements for aligning and blocking lens blanks for subsequent edging operations can be met with the apparatus of the invention.

When aligning and blocking multifocal lens blanks having circular segment portions or single vision lens blanks having no segment portions at all, the 180° meridians and optical centers of such lens blanks are located and marked in the customary manner. This can be accomplished in an instrument of the type shown and described in assignees' U.S. Patent 1,542,112 issued June 16, 1925 to E. D. Tillyer. The lenses are then transferred to apparatus 20 for aligning and blocking wherein the marked 180° meridian of the particular lens blank is aligned parallel to lines 74 of indicia 72 and the marked optical center is decentered relative to axis 76 of apparatus 20 according to the prescriptive requirements of the blank.

Although the lens block B has been illustrated herein as being adhered directly to the lens blank, it should be understood that the blank may if desired be provided with a thin transparent coating of plastic material such as polyvinyl chloride or the like which serves to insure better adherence of the block to the lens blank, but can be readily peeled from the blank after removal of the block.

We claim:
1. Apparatus for aligning a lens and forming a block directly upon one side of the lens comprising the combination of transparent target means having lens aligning indicia thereon, means for receiving and supporting the lens to be aligned in adjacent superimposed relation with said target means, means for projecting light along a path through said target means and lens, a viewing screen arranged to be selectively positioned in said path for receiving light projected through said target means and lens, said screen being adapted to provide a composite image of said indicia and at least a portion of said lens for use in aligning said lens relative to said indicia, a number of block forming molds each having a block forming cavity with opposing open ends, means for indexing a respective mold into predetermined aligned relation with said indicia and with one open end thereof compressively seated against said lens in such manner as to releasably clamp said lens against said supporting means and means for dispensing a fluid but hardenable block forming medium into the opposite open end of said mold to form a block therein in attached relation with said lens for use when hardened in adapting said lens to machinery for performing manufacturing operations thereon.

2. Apparatus for aligning a lens and forming a block directly upon one side of the lens comprising, in combination, a pair of transparent target members each having lens aligning indicia thereon supported in adjacent superimposed relation with each other, one of said members being stationary and the other member being movable in a plane approximately parallel to the plane of said stationary member, means on said stationary member for receiving and supporting a lens to be aligned and blocked, means for projecting light along an established path through said target members and lens when said lens is positioned on said supporting means therefor, a viewing screen for receiving light projected through said target members and lens, said screen being adapted to produce a composite image of said indicia and at least a portion of said lens when said screen is positioned in said path to receive such light, a number of molds each having a block forming cavity with opposite open ends, means for positioning one open end of a respective mold compressively against said lens in such manner as to clamp said lens against said supporting means therefor, means for dispensing a fluid but hardenable block forming medium, movable means functioning cooperatively to support said viewing screen and dispensing means, said movable means being operable to selectively position said viewing screen and dispensing means alternately over said lens and in line therewith respectively for viewing said composite image and for dispensing said block forming medium into the other open end of said mold when said mold is so seated against said lens.

3. Apparatus for aligning a lens and for forming a block directly upon one side of the lens comprising, in combination, a pair of transparent target members each having lens aligning indicia thereon, means for supporting said members in adjacent superimposed relation with each other, one of said members being stationary on said supporting means and the other member being arranged for movement in a plane approximately parallel to the plane of said stationary member, means for effecting movement of said other member to selectively position indicia thereon in desired positional relation to indicia on said stationary member, lens supporting means on said stationary member for receiving and supporting a lens to be aligned and blocked, a source of light, means for projecting light from said source along an established path through said target members and lens when said lens is positioned on said supporting means therefor, a viewing screen for receiving light projected through said target members and lens, said screen being adapted to provide a composite shadow image on said lens and said indicia for use in establishing desired alignment of said lens relative to said indicia when said screen is positioned in said path to receive such light, a number of molds each having a block forming cavity with opposite open ends, mold carrying means upon which said molds are mounted, said mold carrying means being operable to selectively index and seat one open end of a respective mold compressively against said lens in such manner as to releasably clamp the lens against said supporting means therefor and in predetermined aligned relation with said indicia on said stationary target member, means for dispensing a fluid but hardenable block forming medium, movable means functioning cooperatively to support said viewing screen and dispensing means, said movable means being operable to selectively position said viewing screen and dispensing means alternately over said lens and in line therewith respectively for viewing said composite image and for dispensing said block forming medium into the opposite other open end of said mold cavity when said mold is so seated against said lens.

4. Apparatus for aligning a lens and for forming a block directly upon one side of the aligned lens comprising a base, a housing on said base, a pair of transparent target members each having lens aligning indicia thereon, said target members being supported by said housing in adjacent superimposed relation with each other, a first of said target members being stationary on said housing with an outer surface thereof exposed, the second of said target members being supported internally of said housing and adjustable relative to said first target member, manually operable means for adjusting said second target member laterally relative to an established axis through said first target member to selectively position indicia on said second target member in desired adjusted relation to indicia on said first target member, lens supporting means on said exposed surface of said first target member for receiving and supporting a lens to be aligned and blocked, a source of light, means for directing light from said source through said target members and lens, a viewing screen for receiving light directed through said target members and lens, said viewing screen being adapted to provide a composite shadow image of said lens aligning indicia on said target members and at least a portion of said lens, a number of blocking molds each having a block forming cavity with opposite open ends, mold carrying means upon which said molds are mounted, means on said base for rotatably supporting and indexing said mold carrying means in such manner as to selectively seat one open end of a respective mold compressively against a lens positioned on said lens supporting means with said mold being substantially in coaxial alignment with said axis through said target members and functioning to releasably clamp said lens against said supporting means therefor, means for dispensing a fluid but hardenable block forming medium, movable means carrying both said viewing screen and said dispensing means, said movable means being pivotally mounted on said housing for swinging movement to selectively alternately position said viewing screen over said lens for use in aligning said lens and to position said dipsensing means over a block forming mold seated against said lens to provide for the dispensing of said block forming medium into the particular mold seated against said lens.

5. The apparatus of claim 4 further characterized in that said means for dispensing a block forming medium includes a main body part having an upper reservoir section for receiving and storing said block forming medium and a lower measuring section arranged to receive a measured amount of said medium by gravity flow from said reservoir section, means for heating said block forming medium in said sections to render the same fluid, a dispensing nozzle depending from said measuring section, a movable plunger extending into said reservoir and measuring sections, valve means on said plunger constructed and arranged to close said nozzle and permit flow of said medium from said rservoir section into said measuring section when said plunger is moved to one position and to open said nozzle while providing a closure between said sections when said plunger is moved to another position thereby to dispense block forming medium in fluid state from said measuring section through said nozzle.

6. The apparatus of claim 5 further characterized in that said valve means on said plunger for providing closure between said reservoir and measuring sections of said dispensing means is of an inverted cup-shape and supports an air pocket therein, air in said pocket being compressed by said block forming medium during movement of said plunger from said one position to the other thereby causing said block forming medium to be ejected under slight pressure through said nozzle when said nozzle becomes initially opened.

7. Apparatus for aligning and blocking lenses comprising a base, a hollow housing on said base having an opening extending therethrough adjacent the forward end thereof, a first stationary transparent target member having lens aligning indicia thereon overlying said opening, a second transparent target member having other lens aligning indicia thereon adjustably supported within said housing beneath said first target member, means for moving said second target member relative to said first target member to selectively position indicia on said second target member in desired adjusted relation to indicia on said first target member, said housing having opposite side portions extending upwardly adjacent its rearward end with sections thereof respectively directed forward into overhanging relationship with said forward end portion of said housing, a platelike carrier member pivotally mounted between said sections for swinging movement from a first position with its forward portion disposed over said first target member to a second position with its rearward portion disposed over said first target member, a viewing screen supported in said forward portion of said carrier member in substantially coaxial alignment with said first target member when said carrier member is in said first position, means on said first target member for receiving and supporting a lens to be aligned and blocked, a light source arranged to project light into said housing, means in said housing for receiving said light and for directing the same through said target members onto said screen to produce thereon a composite shadow image of said indicia on said target members together with a similar image of at least a portion of a lens positioned upon said supporting means therefor, a number of block forming molds each having an open end adapted to be seated against said lens, mold carrying means upon which said molds are mounted, means on said base for rotatably supporting said mold carrying means and for indexing said molds selectively into predetermined aligned relation compressively against said lens to clamp the lens to said supporting means therefor, dispensing means for supporting and dispensing a block forming medium, said dispensing means being mounted upon said rearward portion of said carrier member in substantially coaxial relation with a respective mold seated against said lens when said carrier member is in said second position and means for actuating said dispensing means to dispense said block forming medium into said mold to form a block on said lens for use in subsequent manufacturing operations to be performed thereon.

8. The apparatus of claim 7 in which said dispensing means includes a main supporting body having a reservoir section for receiving and storing said block forming material and an interconnected lower measuring section arranged to receive by gravity flow and contain a measured amount of said medium from said reservoir section, a nozzle depending from said measuring section, valve means within said supporting body, said valve means being constructed and arranged to close said nozzle and permit flow of said medium from said reservoir section into said measuring section to fill said measuring section when in one position and to open said nozzle while providing a closure between said sections when moved to another position to dispense the block forming material by gravity flow through said nozzle and means for actuating said valve means to selectively effect such positioning thereof.

9. An apparatus for molding a work holding block directly in place upon one side of a lens comprising means for receiving and supporting the lens in predetermined aligned relationship with an established reference axis in said apparatus, a block forming mold having an open end which is adapted to be seated compressively against a side of said lens to clamp said lens against said supporting means and means for dispensing a measured amount of a fluid but hardenable block forming material into said mold to form said block directly in place upon said side of said lens, said apparatus being characterized in that the dispensing means comprises a main supporting body having an upper reservoir section for receiving and storing said block forming medium and an interconnected lower measuring section arranged to receive by gravity flow and contain a measured amount of said medium from said reservoir section, a nozzle depending from said measuring section, valve means within said body constructed and arranged to close said nozzle and permit flow of said medium from said reservoir section into said measuring section to fill the measuring section when in one position and to open said nozzle while providing a closure between said sections when moved to another position, said valve means including an inverted cup-shaped member for effecting closure between said reservoir and measuring sections, said member being so arranged as to support a pocket of air, air in said pocket being compressed by said block forming medium as a result of movement of said valve means from said one position toward said other position to cause said block forming medium to be ejected under slight pressure through said nozzle when said nozzle becomes initially opened and to thereafter flow freely from said measuring section under the influence of gravity, and means for actuating said valve means to selectively effect said positioning thereof.

References Cited by the Examiner

UNITED STATES PATENTS

| | | | |
|---|---|---|---|
| 1,911,153 | 5/1933 | Hill | 51—277 X |
| 2,453,080 | 11/1948 | Shimp | 222—453 |
| 2,580,507 | 1/1952 | Bernheim et al. | 51—277 |
| 2,803,853 | 8/1957 | Brazier | 18—20 |
| 2,834,051 | 5/1958 | Rekettye | 18—30 |
| 3,015,196 | 1/1962 | Campbell | 51—277 |
| 3,049,766 | 8/1962 | Buckminster | 22—58 |
| 3,101,159 | 8/1963 | Fletcher | 222—453 |

J. SPENCER OVERHOLSER, *Primary Examiner.*

MICHAEL B. BRINDISI, *Examiner.*